US008510239B2

(12) United States Patent
Modha

(10) Patent No.: US 8,510,239 B2
(45) Date of Patent: Aug. 13, 2013

(54) COMPACT COGNITIVE SYNAPTIC COMPUTING CIRCUITS WITH CROSSBAR ARRAYS SPATIALLY IN A STAGGERED PATTERN

(75) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/916,306

(22) Filed: Oct. 29, 2010

(65) Prior Publication Data

US 2012/0109866 A1 May 3, 2012

(51) Int. Cl.
*G06F 15/18* (2006.01)
(52) U.S. Cl.
USPC ........................................................... 706/14
(58) Field of Classification Search
USPC .......................................... 706/12, 45, 62, 14
See application file for complete search history.

(56) References Cited

U.S. PATENT DOCUMENTS

| 5,293,457 | A | * | 3/1994 | Arima et al. ..................... 706/34 |
| H2215 | H | | 4/2008 | Allen et al. |
| 7,430,546 | B1 | | 9/2008 | Suri |
| 7,978,510 | B2 | | 7/2011 | Modha et al. |
| 2009/0070550 | A1 | | 3/2009 | Solomon |
| 2010/0277232 | A1 | * | 11/2010 | Snider ........................... 327/565 |
| 2011/0004579 | A1 | * | 1/2011 | Snider ............................. 706/25 |
| 2011/0119214 | A1 | * | 5/2011 | Breitwisch et al. .............. 706/33 |
| 2011/0153533 | A1 | | 6/2011 | Jackson et al. |

FOREIGN PATENT DOCUMENTS

WO 2004027704 A1 4/2004

OTHER PUBLICATIONS

Camilleri, P. et al., "A Neuromorphic aVLSI Network Chip with Configurable Plastic Synapses," Seventh International Conference on Hybrid Intelligent Systems, IEEE, 2007, pp. 296-301, United States.
Indiveri, G. et al., "A VLSI Array of Low-Power Spiking Neurons and Bistable Synapses With Spike-Timing Dependent Plasticity," IEEE Transactions on Neural Networks, vol. 17, No. 1, Jan. 2006, pp. 211-221, United States.
Koickal, T.J. et al., "An On-Chip Adaptive Spike Timing Based Offset Cancellation Scheme for Neuromorphic Sensing," Second NASA/ESA Conference on Adaptive Hardware and Systems (AHS 2007), Aug. 2007, Scotland, United Kingdom, IEEE Computer Society, 2007, pp. 1-5, United States.
Schoenauer, T. et al., "Digital Neurohardware: Principles and Perspectives," Neuronal Networks in Applications (NN '98), 1998, pp. 101-106, Magdeburg, Germany.

(Continued)

*Primary Examiner* — David Vincent
(74) *Attorney, Agent, or Firm* — Kenneth L. Sherman, Esq.; Michael Zarrabian, Esq.; Sherman & Zarrabian LLP

(57) ABSTRACT

Embodiments of the invention relate to producing spike-timing dependent plasticity using electronic neurons interconnected in a crossbar array network. The crossbar array network comprises a plurality of crossbar arrays. Each crossbar array comprises a plurality of axons and a plurality of dendrites such that the axons and dendrites are transverse to one another, and multiple synapse devices, wherein each synapse device is at a cross-point junction of the crossbar array coupled between a dendrite and an axon. The crossbar arrays are spatially in a staggered pattern providing a staggered crossbar layout of the synapse devices.

27 Claims, 17 Drawing Sheets

(56) References Cited

OTHER PUBLICATIONS

Afifi, A. et al., "Implementation of Biologically Plausible Spiking Neural Network Models on the Memristor Crossbar-based CMOS/Nano Circuits," European Conference on Circuit Theory and Design, Aug. 2009, IEEE, pp. 563-566, Antalya, Turkey.

Mayr, C. et al., "Mapping Complex, Large-Scale Spiking Networks on Neural VLSI," World Academy of Science, Engineering and Technology 25, 2007, pp. 40-45, United States.

Allen, J.N. et al., "Plasticity Recurrent Spiking Neural Networks for Olfactory Pattern Recognition," 48th Midwest Symposium on Circuits and Systems, vol. 2, Aug. 2005, Covington, KY, IEEE, 2005, pp. 1741-1744, United States.

Folling, S. et al., "Single-Electron Latching Switches as Nanoscale Synapses," Proceedings of the International Joint Conference on Neural Networks (IJCNN '01), Jul. 2001, Washington, D.C. United States, IEEE, 2001, pp. 216-221, United States.

Cameron, K. et al., "Spike Timing Dependent Plasticity (STDP) can Ameliorate Process Variations in Neuromorphic VLSI," IEEE Transactions on Neural Networks, vol. 16, No. 6, Nov. 2005, IEEE, 2005, pp. 1626-1637, United States.

Choi, K. et al., "VLSI Implementation of a 256×256 Crossbar Interconnection Network," Proceedings of the 6th International Parallel Processing Symposium, IEEE, 1992, pp. 289-293, United States.

Likharev, K.K., "Hybrid CMOS/Nanoelectronic Circuits: Opportunities and Challenges," Journal of Nanoelectronics and Optoelectronics, vol. 3, American Scientific Publishers, 2008, pp. 203-230, United States.

Dehon, A. et al., "Hybrid CMOS/Nanoelectronic Digital Circuits: Devices, Architectures, and Design Automation", Proceedings of the 2005 IEEE/ACM International Conference on Computer-Aided Design, ICCAD-2005, Nov. 6-10, 2005, pp. 375-382, IEEE, United States.

Snider, G.S., "Spike-Timing-Dependent Learning in Memristive Nanodevices", Proceedings of the 2008 IEEE International Symposium on Nanoscale Architectures, NANOARCH 2008, Jun. 12-13, 2008, pp. 85-92, IEEE, United States.

Strukov, D.B. et al., "Hybrid CMOS/Memristor Circuits", Proceedings of the 2010 IEEE International Symposium on Circuits and Systems (ISCAS), May 30, 2010-Jun. 2, 2010, pp. 1967-1970, IEEE, United States.

Likharev, K.K., "Neuromophic CMOL Circuits", Proceedings of the 2003 Third IEEE Conference on Nanotechnology, 2003. IEEE-NANO 2003, Aug. 12, 2003, pp. 339-342, vol. 1, IEEE, United States.

Strukov, D.B. et al., "Four-dimensional address topology for circuits with stacked multilayer crossbar arrays", Proceedings of the National Academy of Sciences, Dec. 1, 2009, pp. 1-4, vol. 106, No. 48, PNAS, United States.

International Search Report and Written Opinion dated Nov. 10, 2011 for International Application No. PCT/EP2011/063400 from European Patent Office, pp. 1-13, Rijswijk, Netherlands.

\* cited by examiner

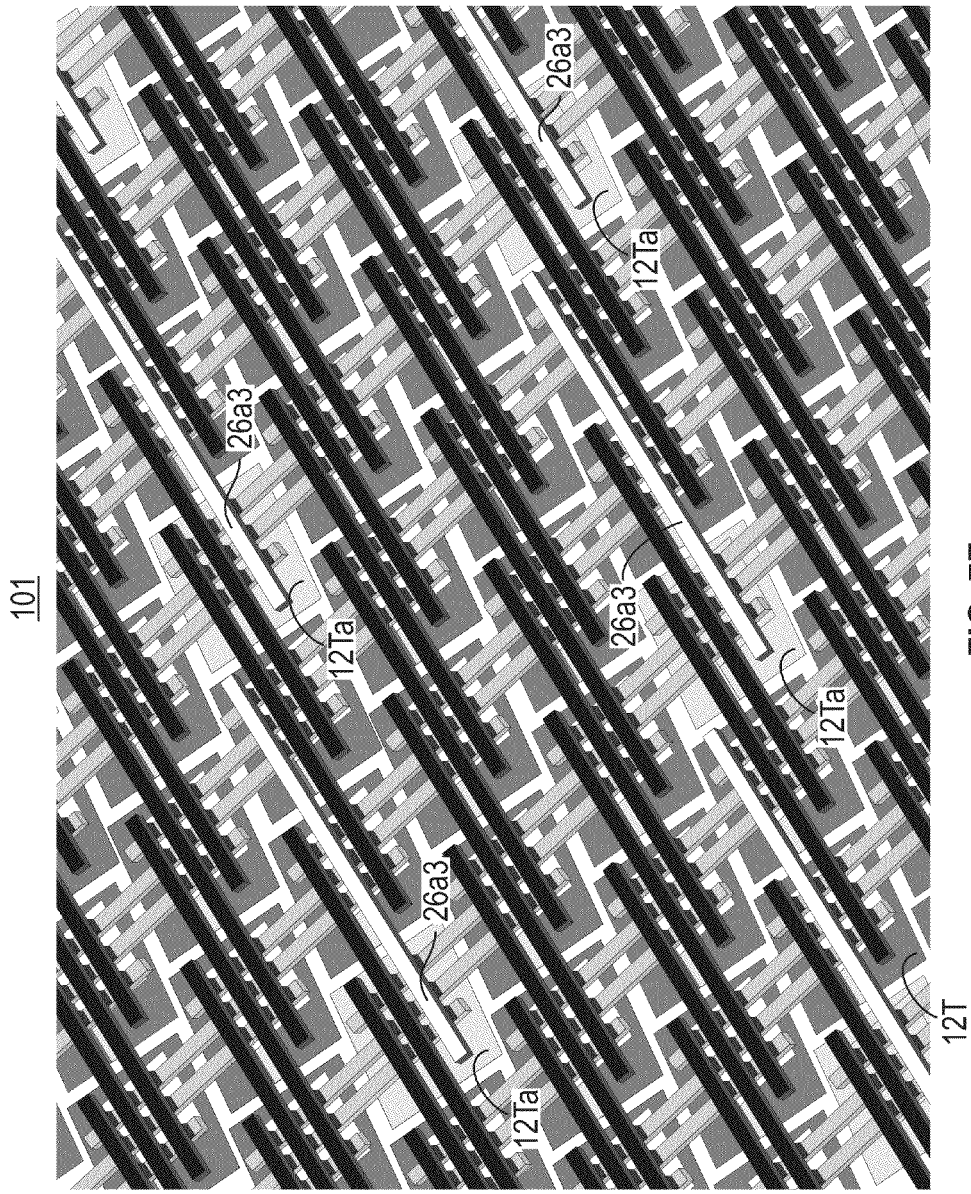

COMPACT COGNITIVE SYNAPTIC COMPUTING CIRCUITS WITH CROSSBAR ARRAYS SPATIALLY IN A STAGGERED PATTERN

This invention was made with United States Government support under Agreement No. HR0011-09-C-0002 awarded by Defense Advanced Research Projects Agency (DARPA). The Government has certain rights in the invention.

BACKGROUND

The present invention relates generally to neuromorphic and synaptronic systems, and more specifically to neuromorphic and synaptronic systems based on spike-timing dependent plasticity.

Biological systems impose order on the information provided by their sensory input. This information typically comes in the form of spatiotemporal patterns comprising localized events with a distinctive spatial and temporal structure. These events occur on a wide variety of spatial and temporal scales, and yet a biological system such as the brain is still able to integrate them and extract relevant pieces of information. Such biological systems can rapidly extract signals from noisy spatiotemporal inputs.

In biological systems, the point of contact between an axon of a neuron and a dendrite on another neuron is called a synapse, and with respect to the synapse, the two neurons are respectively called pre-synaptic and post-synaptic. The essence of our individual experiences is stored in the conductance of the synapses. The synaptic conductance can change with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

Neuromorphic and synaptronic systems, also referred to as artificial neural networks, are computational systems that permit electronic systems to essentially function in a manner analogous to that of biological brains. Neuromorphic and synaptronic systems do not generally utilize the traditional digital model of manipulating 0s and 1s in a sequential fashion but rather use parallel and distributed processing. Instead, neuromorphic and synaptronic systems create connections between processing elements that mimic neurons and synapses of a biological brain. Neuromorphic and synaptronic systems may comprise various electronic circuits that are modeled on biological neurons and synapses.

BRIEF SUMMARY

Embodiments of the invention provide spike-timing dependent plasticity using electronic neurons interconnected in a crossbar array network. In one embodiment, the crossbar array network comprises a plurality of crossbar arrays. Each crossbar array comprises a plurality of axons and a plurality of dendrites such that the axons and dendrites are transverse to one another, and multiple synapse devices, wherein each synapse device is at a cross-point junction of the crossbar array coupled between a dendrite and an axon. The crossbar arrays are spatially in a staggered pattern providing a staggered crossbar layout of the synapse devices.

In one embodiment of the invention, a method includes sending a spiking signal from an electronic neuron to each axon and each dendrite connected to a spiking electronic neuron in a network of electronic neurons. In one embodiment of the invention, each of the plurality of electronic neurons corresponds to one of the plurality of the crossbar arrays.

In one embodiment of the invention, a clocking signal is generated for activation of multiple crossbar arrays in the network at the same time. For each of the multiple crossbar arrays and corresponding electronic neurons, based on the clocking signals, the method further includes, upon an electronic neuron firing, communicating a signal to corresponding axons and dendrites. The axons communicate a read signal, which also serves as alert for depressing part of STDP. The axons communicate a reset signal and certain dendrites probabilistically respond back. The dendrites communicate a set signal and certain axons probabilistically respond back. The number of ON bits on an axon are read, and the number of ON bits on a dendrite are read.

These and other features, aspects and advantages of the present invention will become understood with reference to the following description, appended claims and accompanying figures.

BRIEF DESCRIPTION OF THE SEVERAL VIEWS OF THE DRAWINGS

FIG. 7E shows activated crossbar tiles with a second set of activated dendrites in the network of FIG. 7D, in accordance with an embodiment of the invention;

FIG. 7F shows activated crossbar tiles with a third set of activated dendrites in the network of FIG. 7D, in accordance with an embodiment of the invention.

DETAILED DESCRIPTION

Embodiments of the invention provide neuromorphic and synaptronic systems, including a computing chip featuring a cross-quilted crossbar layout of synapse devices (synapses) interconnecting a plurality of electronic neurons, providing reading and programming of synapses according to spike-timing dependent plasticity (STDP), and coordinating operating multiple cross-bars in parallel.

Figure 1A:
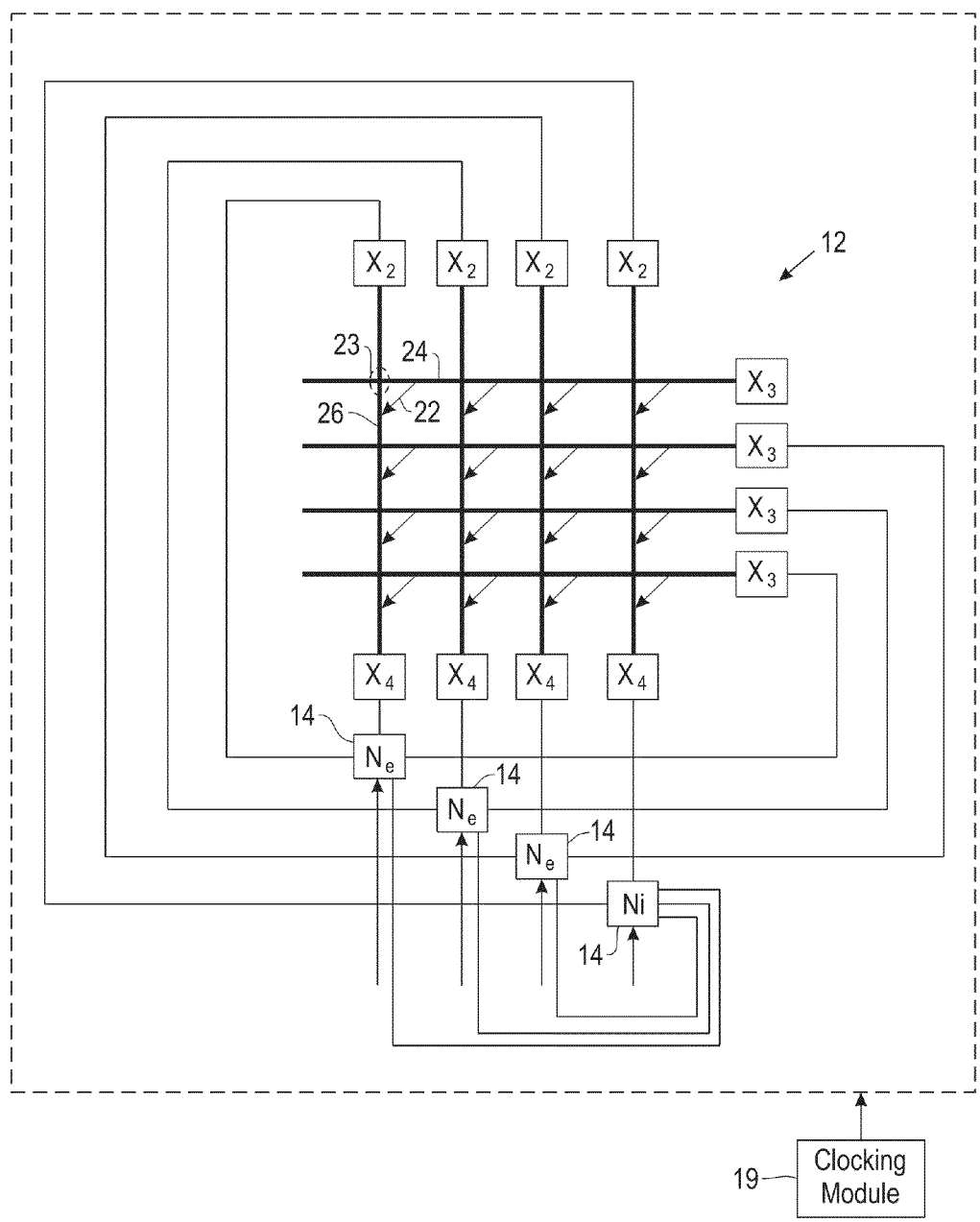
FIG. 1A shows a diagram of a synaptic crossbar array for spiking computation, in accordance with an embodiment of the invention.

Referring now to FIG. 1A, there is shown a diagram of a representation of a neuromorphic and synaptronic system 100 comprising a crossbar array 12 having a plurality of neurons 14. The neurons are also referred to herein as "electronic neurons." The system 100 further comprises a plurality of synapse devices 22 including variable state resistors at the cross-point junctions 23 of the crossbar array 12, wherein the synapse devices 22 are connected between axons 24 and dendrites 26. The axons 24 and dendrites 26 are transverse to one another at the cross-point junctions. FIG. 1A shows an embodiment wherein the axons 24 and dendrites 26 are in orthogonal configuration at the cross-point junctions in a special case. ("Ne" comprise excitatory neurons and "Ni" comprise inhibitory neurons). It is important to note that while FIG. 1A shows that the neurons form a recurrent loop, in general, different neurons will project their output to other neurons in different cross-bars.

Figure 1B:
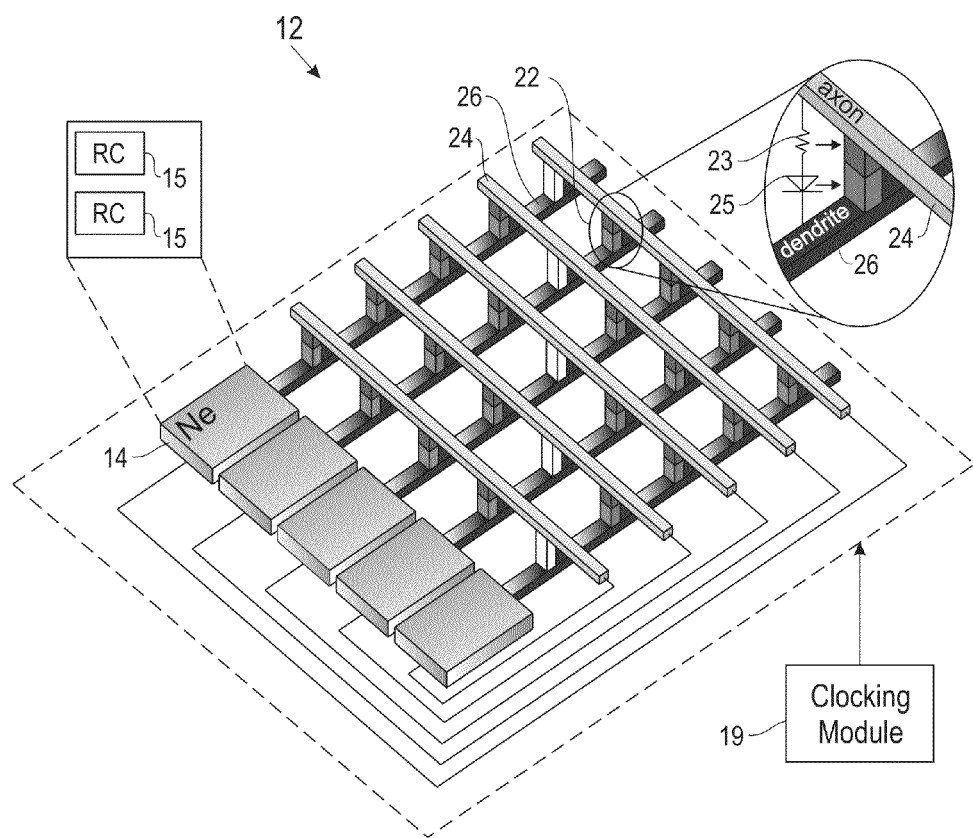
FIG. 1B shows a diagram of an implementation of the synaptic crossbar array of FIG. 1A, in accordance with an embodiment of the invention.

FIG. 1B shows an example implementation of the crossbar array 12, wherein each synapse device 22 comprises a variable state resistor 23 as a programmable resistor. The crossbar array 12 comprises a nano-scale crossbar array comprising said resistors 23 at the cross-point junctions, employed to implement arbitrary and plastic connectivity between said electronic neurons. An access or control device 25 such as a PN diode or an FET wired as a diode (or some other element with a nonlinear voltage-current response), may be connected in series with the resistor 23 at every crossbar junction to prevent cross-talk during signal communication (neuronal firing events) and to minimize leakage and power consumption; however this is not a necessary condition to achieve synaptic functionality. The synaptic device need not be a variable state resistor and in another embodiment may comprise a memory element such as SRAM, DRAM, EDRAM, etc.

In one embodiment of the invention, each electronic neuron comprises a pair of RC circuits 15. In general, in accordance with an embodiment of the invention, neurons "fire" (transmit a pulse) when the integrated inputs they receive from dendritic input connections 26 exceed a threshold. When neurons fire, they maintain an anti-STDP (A-STDP) variable that decays with a relatively long, predetermined, time constant determined by the values of the resistor and capacitor in one of its RC circuits. For example, in one embodiment, this time constant may be about 50 ms. The A-STDP variable may be sampled by determining the voltage across the capacitor using a current mirror, or equivalent circuit. This variable is used to achieve axonal STDP, by encoding the time since the last firing of the associated neuron. Axonal STDP is used to control "potentiation", which in this context is defined as increasing synaptic conductance. When neurons fire, they also maintain a D-STDP variable that decays with a relatively long, predetermined, time constant based on the values of the resistor and capacitor in one of its RC circuits 15. As used herein, the term "when" can mean that a signal is sent instantaneously after a neuron fires, or some period of time after the neuron fires.

As shown in FIG. 1A, the electronic neurons 14 are configured as circuits at the periphery of the crossbar array 12. In addition to being simple to design and fabricate, the crossbar architecture provides efficient use of the available space. The crossbar array 12 can be configured to customize communication between the neurons. Arbitrary connections can be obtained by blocking certain synapses at fabrication level. Therefore, the architectural principles herein can mimic all the direct wiring combinations observed in biological neuromorphic and synaptronic networks.

The crossbar array 12 further includes driver (router) devices $X_2$, $X_3$ and $X_4$ as shown in FIG. 1A (the driver devices are not shown in FIG. 1B for clarity). The devices $X_2$, $X_3$ and $X_4$ comprise interface driver devices. Specifically, the dendrites 26 have driver devices $X_2$ on one side of the crossbar array 12 and sense amplifiers $X_4$ on the other side of the crossbar array. The axons 24 have driver devices $X_3$ on one side of the crossbar array. In one embodiment, the driver devices comprise complementary metal oxide semiconductor (CMOS) logic circuits implementing the functions described herein.

Figure 2A:
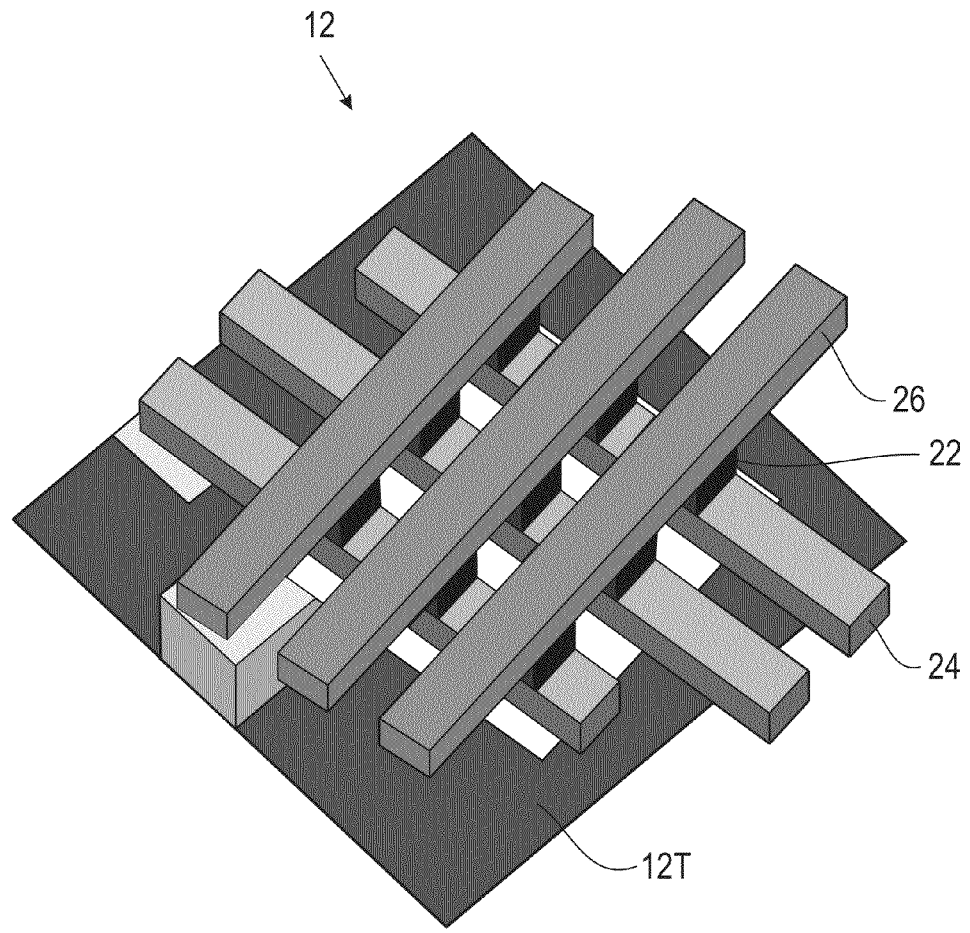
FIG. 2A shows a diagram of an implementation of the synaptic crossbar array of FIG. 1A implemented as a circuit tile, in accordance with an embodiment of the invention.

FIG. 2A shows a perspective view of a crossbar arrays 12 wherein the axons 24 and dendrites 26 in each crossbar array are in less than 90° configuration at the cross-point junctions in a general case. Each crossbar array comprise a circuit tile 12T comprising an N×N group of synapses 22 at cross-point junctions of N axons 24 and N dendrites 26. In this example, N=3, wherein each tile 12T comprises a 3×3 crossbar array including three axons 24 in transverse configuration to three dendrites 26. N is an integer greater than 0.

Figure 2B:
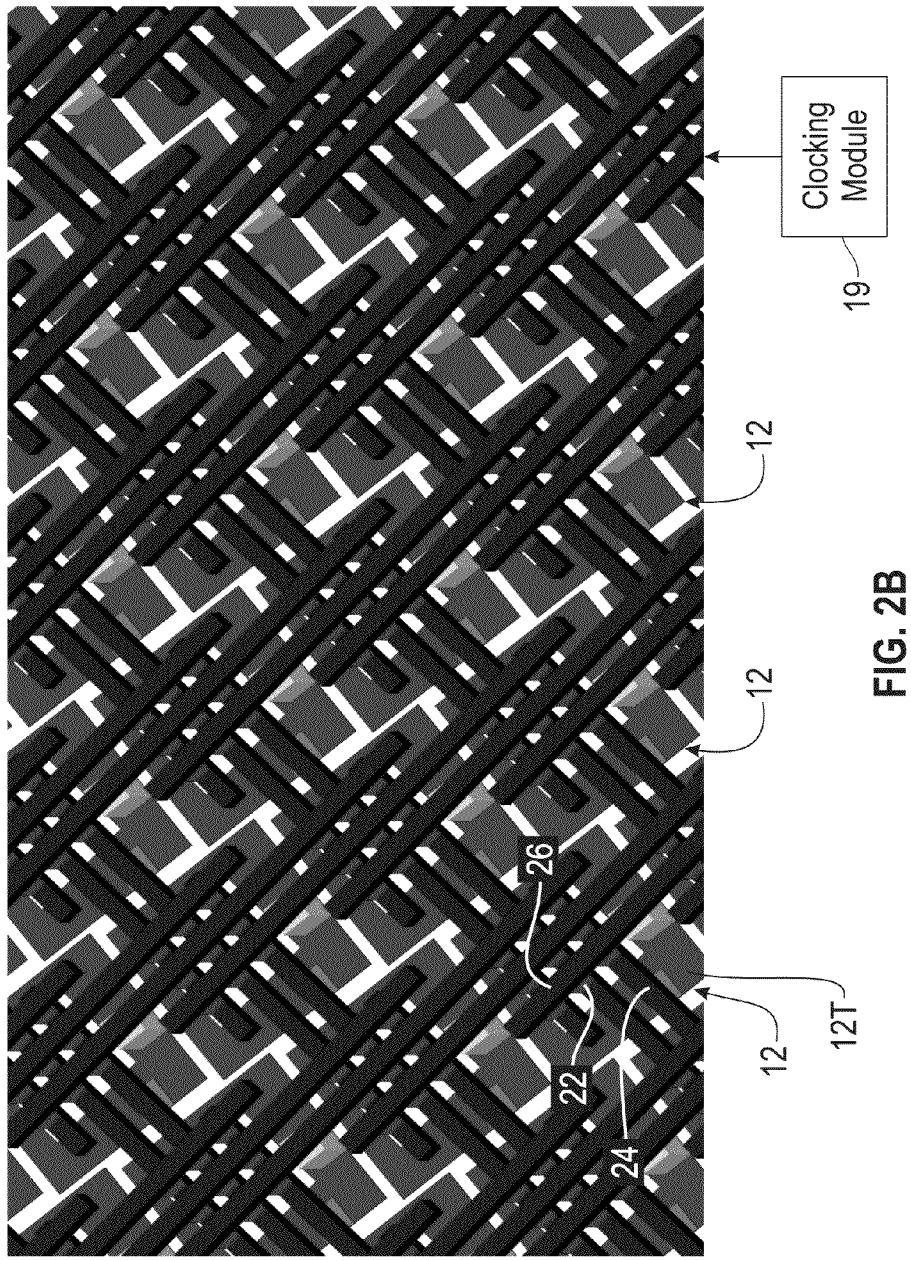
FIG. 2B shows a perspective view diagram of a network of multiple interlinked synaptic crossbar array tiles, in accordance with an embodiment of the invention.

FIG. 2B shows a perspective view of a network 101 comprising a circuit including a plurality of spatially staggered crossbar arrays 12 in a two dimensional plane, according to an embodiment of the invention. In the network 101, the axons 24 and dendrites 26 in each crossbar array may be in less than 90° configuration at the cross-point junctions in a general case. Each crossbar array 12 comprises an N×N group of synapses 22 at cross-point junctions of N axons 24 and N dendrites 26 (e.g., N=3). The tiles 12T are offset, providing a staggered pattern of tiles 12T. Groups of tiles 12T are interconnected via common axons 24 and dendrites 26, providing a cross-quilted crossbar layout of the synapses 22. The network 101 in FIG. 2B allows interconnecting electronic neurons (not shown) using each crossbar or tile. As such, the crossbar arrays 12 are in a staggered pattern providing a cross-quilted crossbar layout of synapses 22 in the network 101, wherein the synapses 22 are in N×N groups.

Figure 2C:
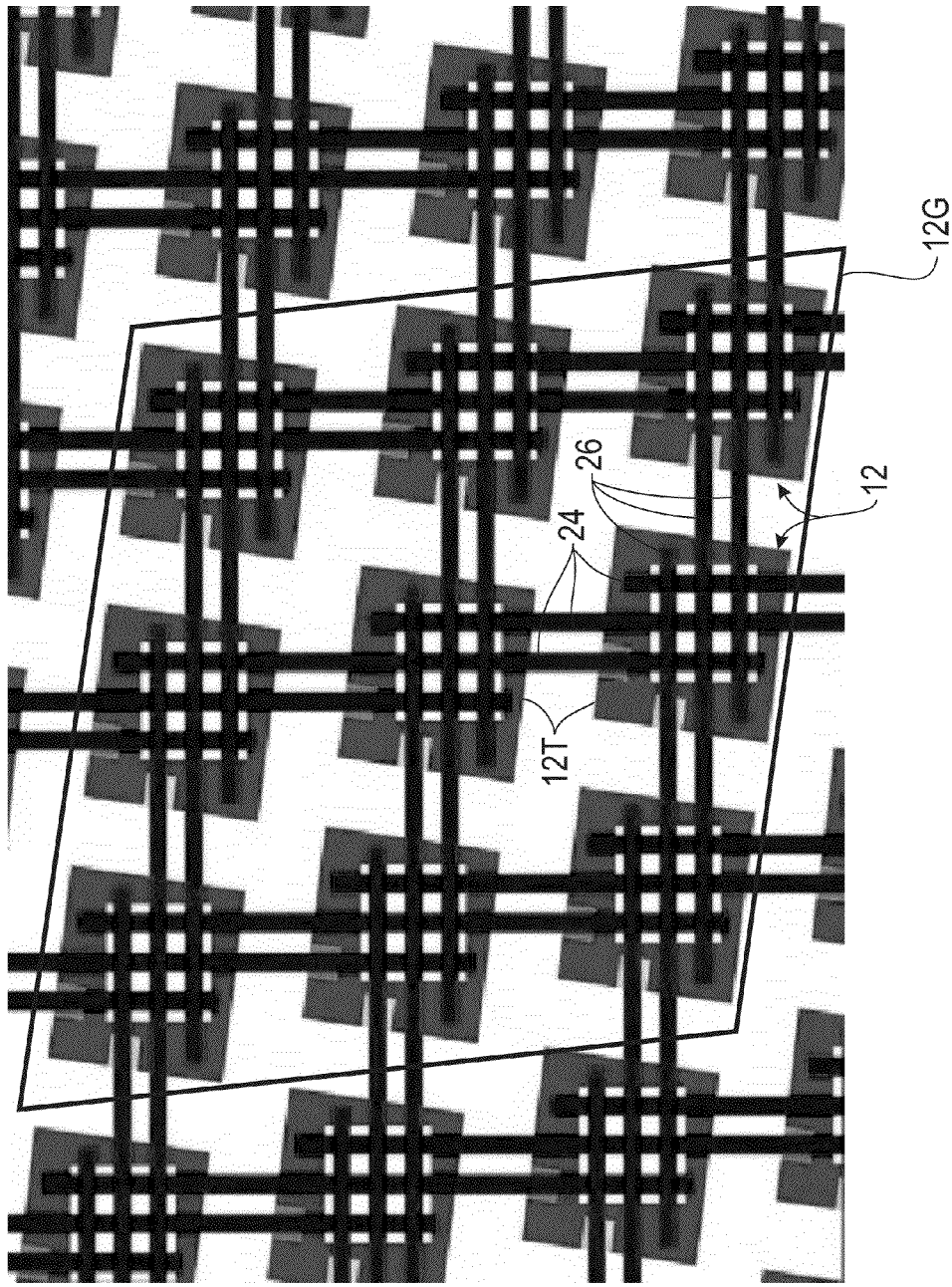
FIG. 2C shows a top view diagram of the network of FIG. 2B, in accordance with an embodiment of the invention.
Figure 2D:
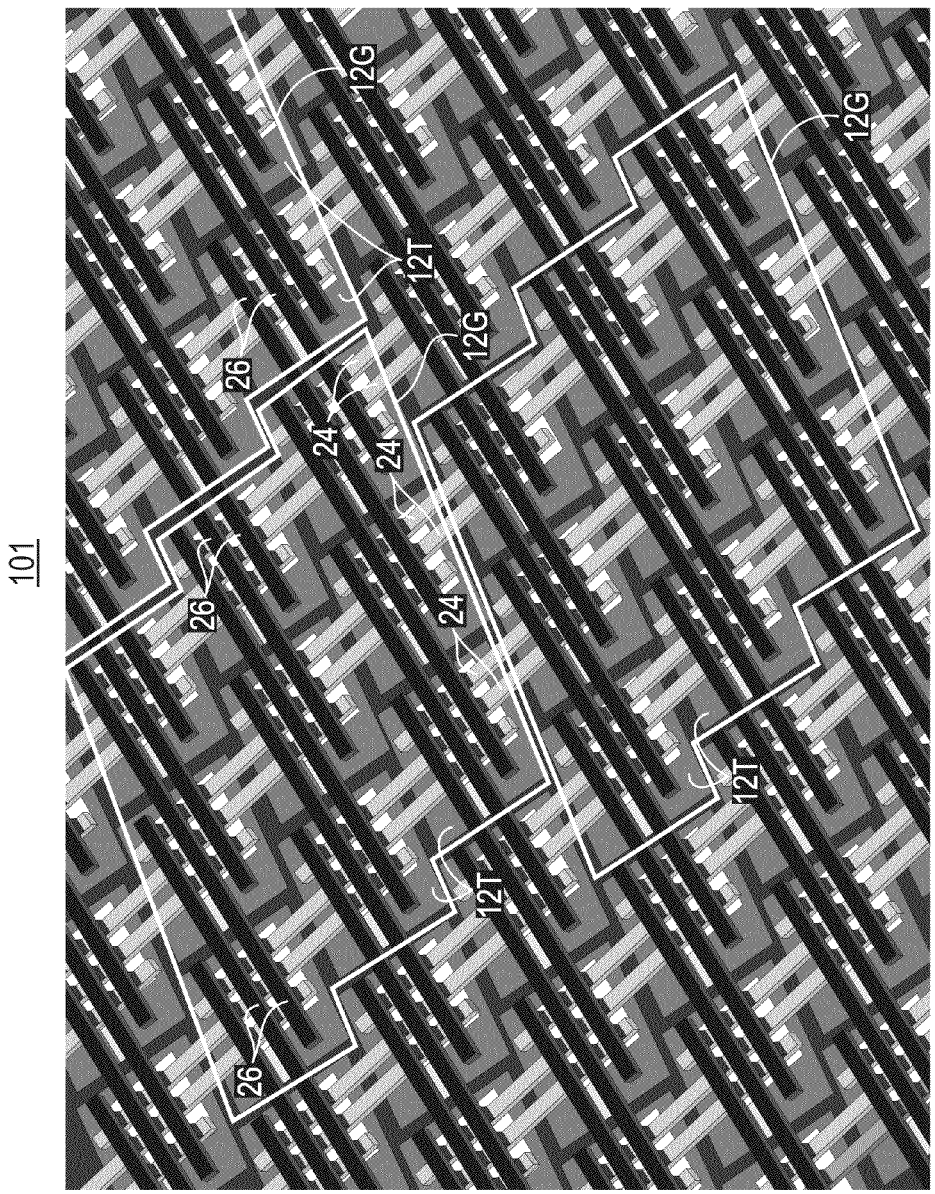
FIG. 2D shows a perspective view of the network of FIG. 2B with groups of crossbar tiles in grids, in accordance with an embodiment of the invention.

FIG. 2C shows a top view of a portion of the network 101 of FIG. 2B, illustrating an N×N group of tiles 12T in a grid 12G (e.g., N=3). N×N groups of tiles 12T in each grid 12G are interconnected via common axons 24 and dendrites 26, providing a cross-quilted crossbar layout of synapses at cross-point junctions in the tiles 12T. FIG. 2D shows another perspective view of the network 101, wherein the tiles 12T in each grid 12G are also interconnected to neighboring tiles 12T in neighboring grids 12G by common axons 24 and dendrites 26. Each tile 12T is connected to a neighboring tile, left or right, via N−1 dendrites 26. Each tile 12T is connected to a neighboring tile, above or below, via N−1 axons 24.

In each grid 12G, an axon 24 traverses across N tiles 12T and each dendrite traverses N tiles 12T. Number of crossbar tiles 12T in a grid 12G is a function of the number of synapses in a tile 12T.

The crossbar tiles 12T are offset from one another in a Cartesian (X, Y) plane, to provide the connectivity between the dendrites and axons. The offset allows approximation of the connections in a biological brain more faithfully. Staggering allows electronic neurons connected to one crossbar 12 to communicate to neurons connected to another crossbar using the axons, dendrites and synapses at cross-point junctions. Each neuron corresponds to a tile 12T.

Figure 3:
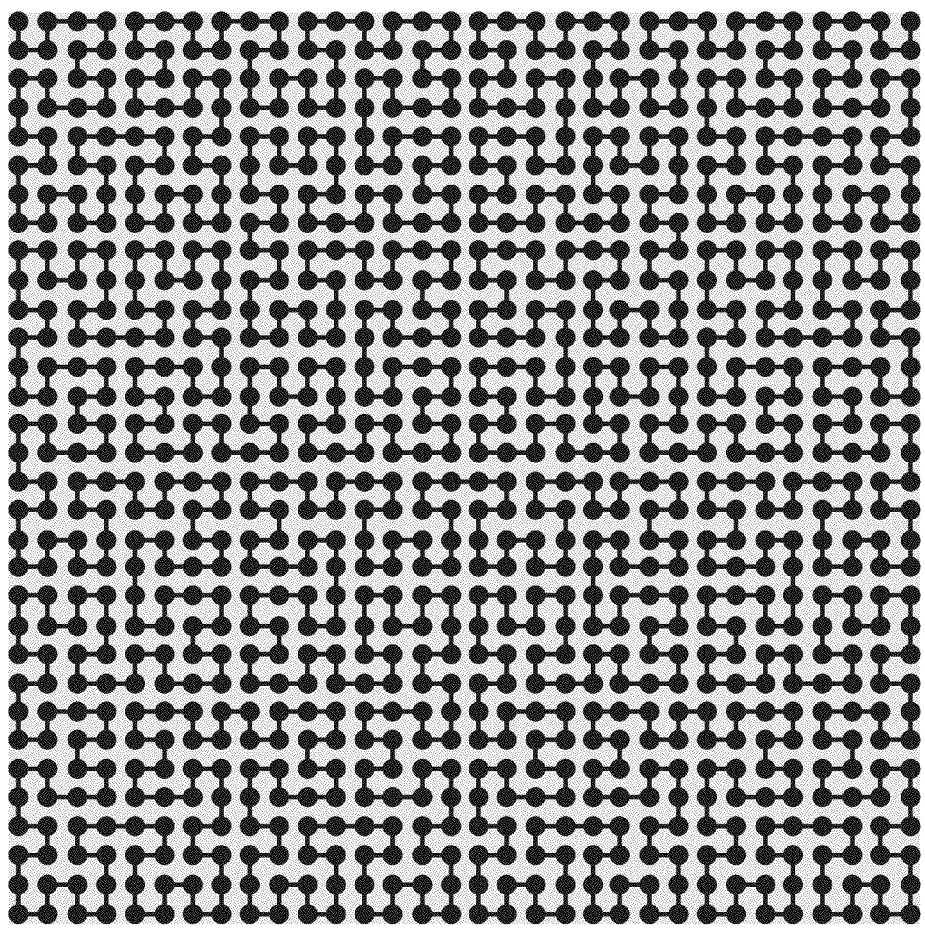
FIG. 3 shows an example of a continuous communication path that links neurons interconnected by the network of FIG. 2B, in accordance with an embodiment of the invention.

Because the tiles 12T (and corresponding neurons) in the network 101 are organized in grids 12G, it is possible to have a space-filling curve connecting them if it is necessary, resembling a bus. The neurons interconnected by the crossbar network 101, are arranged in a regular lattice, connected via a continuous communication path 13 that links each neuron. The path 13 defines a bus that connects all the neurons, as shown by example in FIG. 3, wherein location of each neuron is shown by a solid circle on the path 13. FIG. 3 provides an example connection based on a two-dimensional coordinate system.

Figure 4:
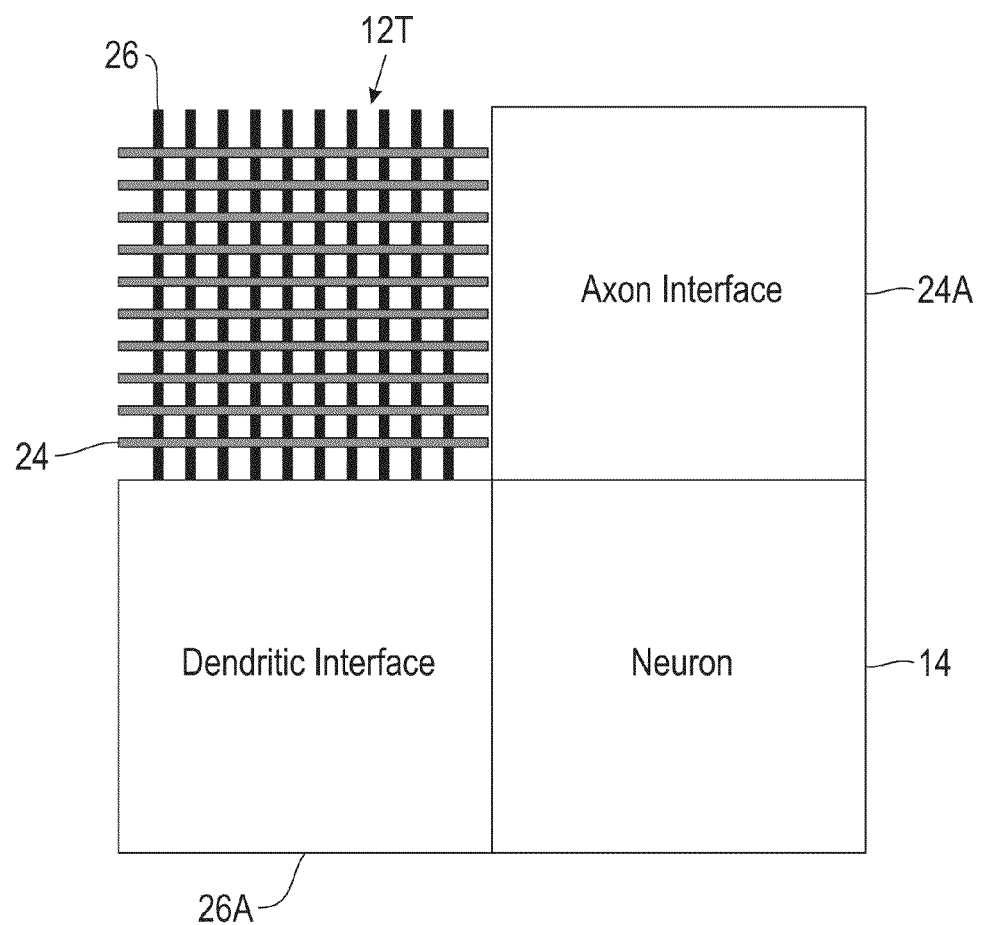
FIG. 4 shows composition of a crossbar array, decomposed into four component portions, in accordance with an embodiment of the invention.
Figure 5:
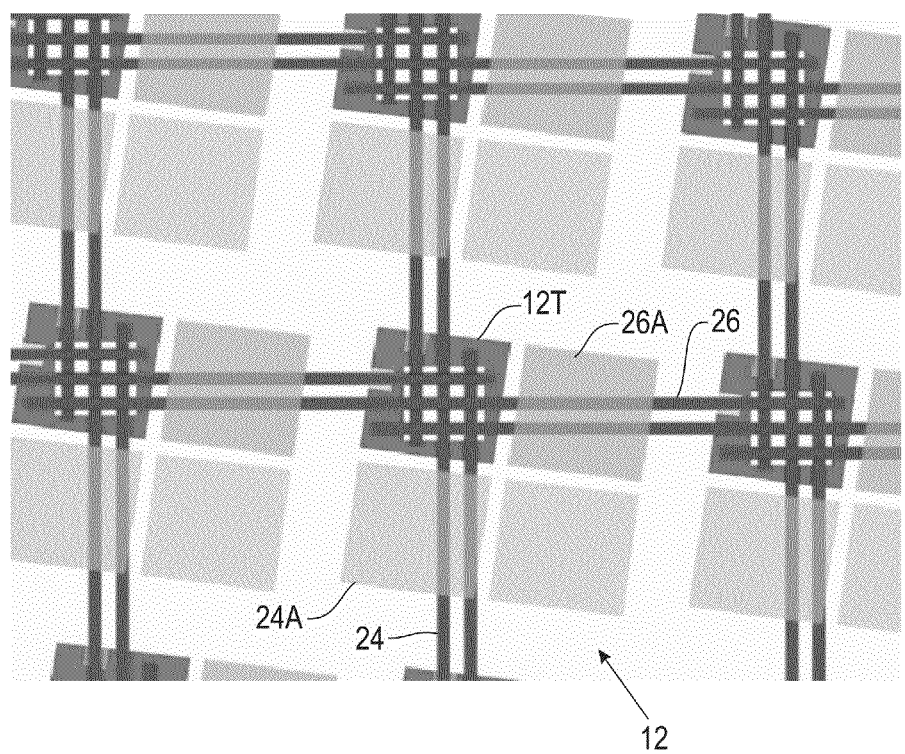
FIG. 5 shows a portion of the network of FIG. 2B with decomposed crossbar arrays, based on the conceptual decomposition in FIG. 4, in accordance with an embodiment of the invention.

FIG. 4 shows composition of an example crossbar array 12, decomposed into four component portions. In this example, the tile corresponds to an 8×8 crossbar of 8 axons 24, 8 dendrites 26 and 64 synapses. An axonal interface module 24A includes the drivers $X_3$ and a dendritic interface module 26A includes the $X_2$ and $X_4$ drivers. A neuron (such as neuron 14) corresponds to the crossbar 12. FIG. 5 shows a portion of the network 101 with decomposed crossbars 12, according to the conceptual decomposition in FIG. 4.

In one embodiment, a neural network according to the invention, comprises the network circuit 101 including a plurality of axons and a plurality of dendrites in a staggered crossbar arrays 12. Each synapse device comprises a binary state memory device representing a bit at a cross-point junction of the interconnect circuit coupled between a dendrite and an axon. The entire staggered crossbar is interlinked.

In an N×N crossbar 12, an entire row can be read in parallel even if all N bits are ON, with current limiting for protection, wherein the expected number of ON bits is N/2. An attempt may be made to reset (set) an entire row (column), which may not succeed if more than 2 bits are being reset (set), with current limiting for protection. The number of ON bits in a row (column) can be read. An entire column can be read in parallel even if all N bits are ON, with current limiting for protection. The expected number of ON bits is N/2. Key events are when neurons fire. This causes two operations: read and programming. For a read operation, firing by a neuron leads to alerting all neurons to which the firing neuron is connected, sending a send signal to all axon router or drivers $X_3$. Each axon-router $X_3$ supports multiple dendritic reads (in parallel, or partly parallel). For a programming operation, firing by a neuron may cause synaptic change, sending a signal to all axon-routers $X_3$, and to all dendritic-routers $X_2$, $X_4$.

In one embodiment, in the crossbar array 12, a southwest-northeast (SW-NE) direction represents axons, and a southeast-northwest (SE-NW) direction represents dendrites. The circuitry at axonal contacts is denoted as $X_3$ and circuitry at dendritic contacts is denoted as $X_2$ and $X_4$. Each $X_4$ includes a 1-bit ADC (sense amplifier), each $X_2$ includes reset and set circuits, and each $X_3$ includes a read circuit. The present invention provides reduction in power and space requirements of the $X_2$, $X_3$, $X_4$ circuits and the logic used to drive them. For more than one axon to read in parallel, more than a 1-bit ADC is required.

The sense amplifier devices $X_4$ feed into excitatory spiking electronic neurons ($N_e$) which in turn connect into the axon driver devices $X_3$ and dendrite driver devices $X_2$. Generally, an excitatory spiking electronic neuron makes its target neurons more likely to fire. Further, an inhibitory spiking electronic neuron ($N_i$) makes its targets less likely to fire. A variety of implementations of spiking electronic neurons can be utilized. Generally, such neurons comprise a counter that increases when inputs from source excitatory neurons are received and decreases when inputs from source inhibitory neurons are received. The amount of the increase or decrease is dependent on the strength of the connection from a source neuron to a target neuron. Independent of the input, the counter may be periodically decremented to simulate a "leak". If the counter reaches a certain threshold, the neuron then generates its own spike (i.e., fires) and the counter undergoes a reset to a baseline value. The term spiking electronic neuron is referred to as "electronic neuron" herein.

In this example, each of the excitatory neurons ($N_e$) is configured to provide integration and firing. Each inhibitory neuron ($N_i$) is configured to regulate the activity of the excitatory neurons depending on overall network activity. As those skilled in the art will recognize, the exact number of excitatory neurons and inhibitory neurons can vary depending on the nature of the problem to solve using the disclosed architecture herein.

Embodiments of the invention provide neural systems comprising neuromorphic and synaptronic networks including spiking neuronal networks based on STDP learning rules for neuromorphic integrated circuits. One embodiment of the invention provides spike-based computation using CMOS electronic neurons interacting with each other through nanoscale memory synapses such as Phase Change Memory (PCM) circuits.

In one embodiment, an axon driver device $X_3$ provides a long programming pulse and communication spikes. A dendrite driver device $X_2$ provides a programming pulse with a delay. In one embodiment, where a neuron circuit is implemented using analog logic circuits, a corresponding sense amplifier $X_4$ translates PCM (PCM came without any introduction) current levels to neuron current levels for integration. In another embodiment of the invention, where a neuron circuit is implemented using digital logic circuits, a corresponding sense amplifier $X_4$ translates PCM current levels to binary digital signals for integration. For example, a read spike of a short duration (e.g., about 0.05 ms to 0.15 ms and preferably about 0.1 ms long) may be applied to an axon driver device $X_3$ for communication. An elongated pulse (e.g., about 150 ms to 250 ms and preferably about 200 ms long) may be applied to the axon driver device $X_3$ and a short negative pulse may be applied to the dendrite driver device $X_2$ midway through the axon driver pulse (e.g., about 45 ns to 55 ns and preferably about 45 ns long) for programming.

The network 101 functions according to a digital, synchronous scheme. In one embodiment, a clocking module 19 (FIG. 1B) is used to provide an event-driven architecture, utilizing a time-division multiple access scheme (TDMA). TDMA allows read, set, reset, and other communications to occur on the same crossbar across different neurons without conflicts or collision.

In one example, for an N×N crossbar array let M denote a divisor of N, such that M elements of any axon or column can be read/written. For example, N can be 100 and M can be 1, 2, 5, 10, 20, 25, or 50. The clock rate needed to support TDMA on such an array varies as a function of N and M. Fundamentally, the state of every neuron must be updated at T millisecond timesteps which corresponds to a clock rate of 1/T kHz. At each timestep, each axon is to be processed and each dendrite is to be processed, wherein a clock rate of 2N/T kHz is needed.

Processing each axon or dendrite involves the phases, requiring a clock rate of 6N/T kHz. For each phase, N/M sub-phases are needed to process all synaptic elements, wherein a clock rate of $(6N^2)/(M*T)$ kHz is required. When T=0.1, N=100, M=10, this leads to a 60 MHz clock rate. Different memory technologies support different values of N and M. In one example, variable state resistors such as PCM may support a value of M=1 to 10. Other memories such as static random access memory (SRAM) may support larger values such as M=100 or 256. According to embodiments of the invention, the values T, N, M are selected so as to achieve a low clock rate which will result in a substantial power saving over conventional computer systems that may use several GHz clock rates.

By reducing resolution of the timestep T at which state of neurons are updated, the required clock rate may be reduced. For example, when T=0.6, N=100, M=10, this leads to 10 MHz.

In one embodiment, for each neuron there are S synapses. Assuming that S is an integer multiple of N, then each neuron needs to receive dendritic input from the ratio S/N number of crossbars and sends its axonal output to S/N crossbars. Each neuron has S/N dendritic compartments and S/N axonal arbors. When each dendritic component spikes, it communicates a spike to the soma of the neuron soma component. Dendritic components send spikes to the soma, rather than currents or counts. A neuron integrates inputs from all dendritic compartments to decide when to fire.

When a neuron fires, the signal is communicated to all its axons and dendrites. This signaling from dendritic compartments to a neuron are implemented by a form of address-event representation (AER). Neuron and crossbar operations are synchronous, whereas AER is asynchronous.

In a staggered crossbar array network 101, according to an embodiment of the invention, within each crossbar, each axon has a unique identification (unique_id) and each dendrite has a unique_id. Where N=100, in a tile 12T, each axon and dendrite will have a relative identification of:

relative_id=(unique_id)mod(100).

The relative_id ranges from 0 to 99. No two axons belonging to different crossbars but with the same relative_id have overlapping connections, and no two dendrites belonging to different crossbars but with the same relative_id have overlapping connections. As such, all axons and dendrites with the same relative_id can be safely active at a particular time. Thus, a TDMA mechanism can simultaneously act on all axons in the system that have the same relative_id and it can simultaneously act on all dendrites in the system that have the same relative_id. As such, to act on one axon, the entire interconnected, cross-quilted crossbar array need not be locked. The clock rate of $(6N^2)/(M*T)$ kHz described above can be used independent of the number of crossbars in the crossbar array network.

An event-based probabilistic STDP scheme is used, wherein synaptic conductance can change with time as a function of the relative spike times of pre-synaptic and post-synaptic neurons, as per STDP. The STDP rule increases the conductance of a synapse if its post-synaptic neuron fires after its pre-synaptic neuron fires, and decreases the conductance of a synapse if the order of the two firings is reversed. A STDP set is performed via cooperation between a dendrite and all axons that intersect it at junctions in the crossbar array. When a dendrite sends a set signal, some or all of intersecting axons may probabilistically respond with a corresponding signal. Only when a signal arrives from both the axon and dendrite at the same time at a junction does the junction get set. Similarly, the STDP reset is performed via an axon and all dendrites that intersect it at junctions in the crossbar array.

Figure 6:
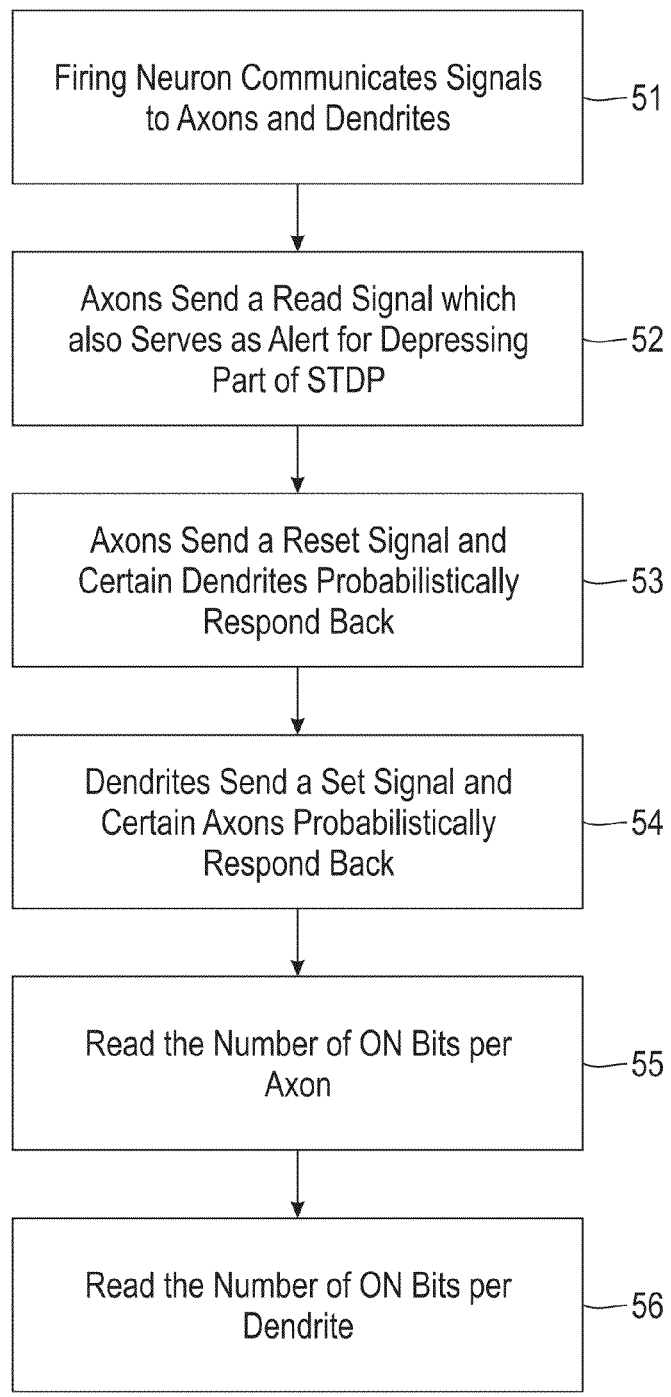
FIG. 6 shows a flowchart of a process for synchronized operation phases of a crossbar array network of electronic neurons utilizing a global clock signal, in accordance with an embodiment of the invention.

In one embodiment of the invention, an operation step in a crossbar array 12 includes six different phases base on clocking signals (e.g., from the global clock module 19, FIG. 1B), according to process blocks of a process 50 illustrated in FIG. 6, wherein:

Block 51: (Phase 1) Update neuron, such that when a neuron fires to communicate a signal to corresponding axons and dendrites (this may be an asynchronous communication), the communication signal goes through AER. Axons/dendrites receive the communication signal at a later evaluation phase. Each neuron may implement axonal delay.

Block 52: (Phase 2) Axons send a read signal which also serves as alert for depressing part of STDP.

Block 53: (Phase 3) Axons send a reset signal and certain dendrites probabilistically respond back.

Block 54: (Phase 4) Dendrites send a set signal and certain axons probabilistically respond back.

Block 55: (Phase 5) Read the number of ON bits based on one or more elements 22 on an axon.

Block 56: (Phase 6) Read the number of ON bits based on one or more element 22 on a dendrite.

FIGS. 7A-7F shows a sequence of operations in the network 101 of N×N group of tiles 12T (e.g., N=3) according to an embodiment of the invention for implementing the six phases described above in a time-multiplexing manner, wherein several tiles 12T are activated at the same time (indicated by bold coloring), rather than scanning through every axon and dendrite one at a time.

Figure 7A:
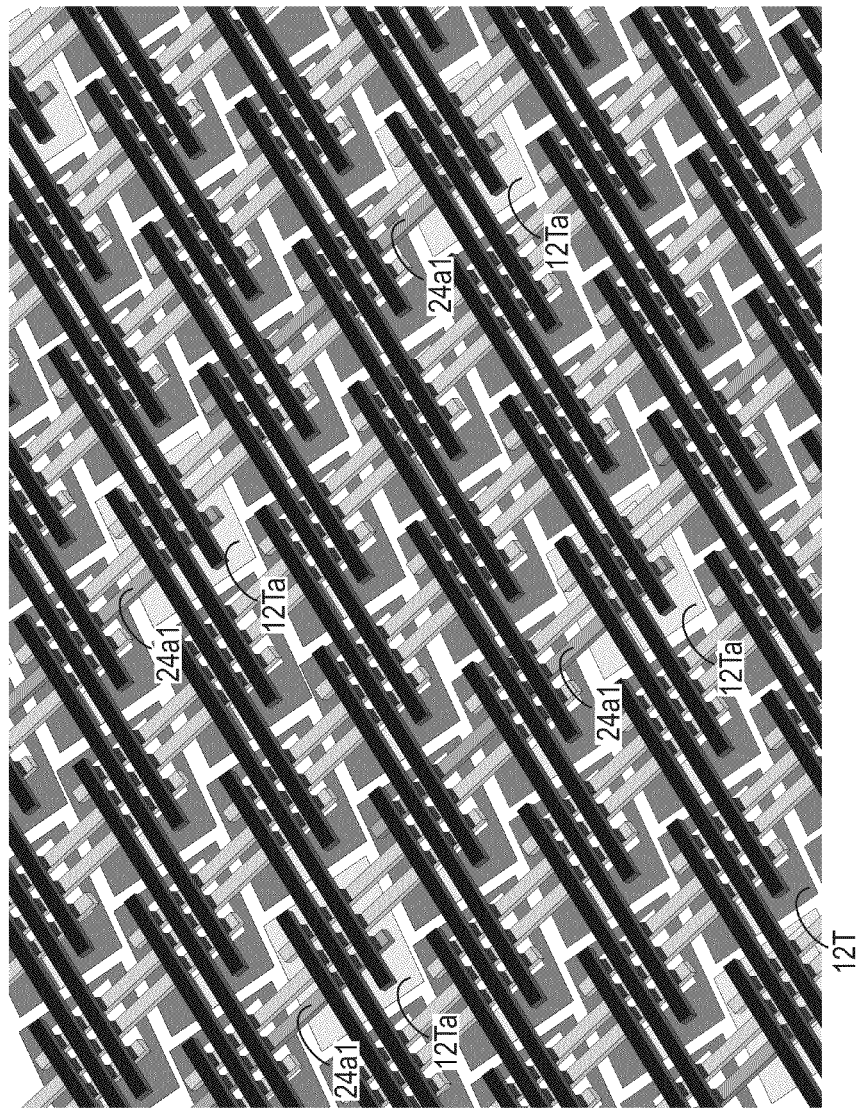
FIG. 7A shows activated crossbar tiles with a first set of activated axons in the network of FIG. 2B, in accordance with an embodiment of the invention.
Figure 7B:
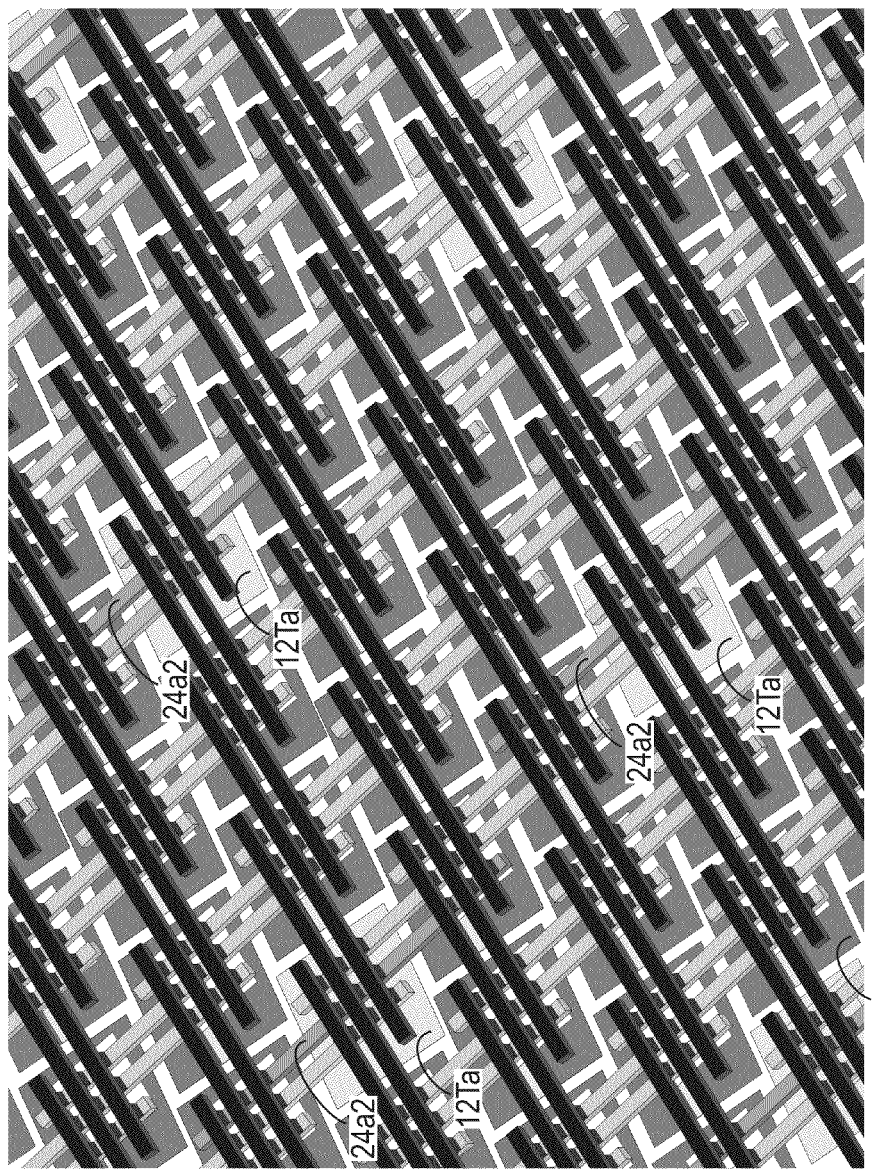
FIG. 7B shows activated crossbar tiles with a second set of activated axons in the network of FIG. 7A, in accordance with an embodiment of the invention.
Figure 7C:
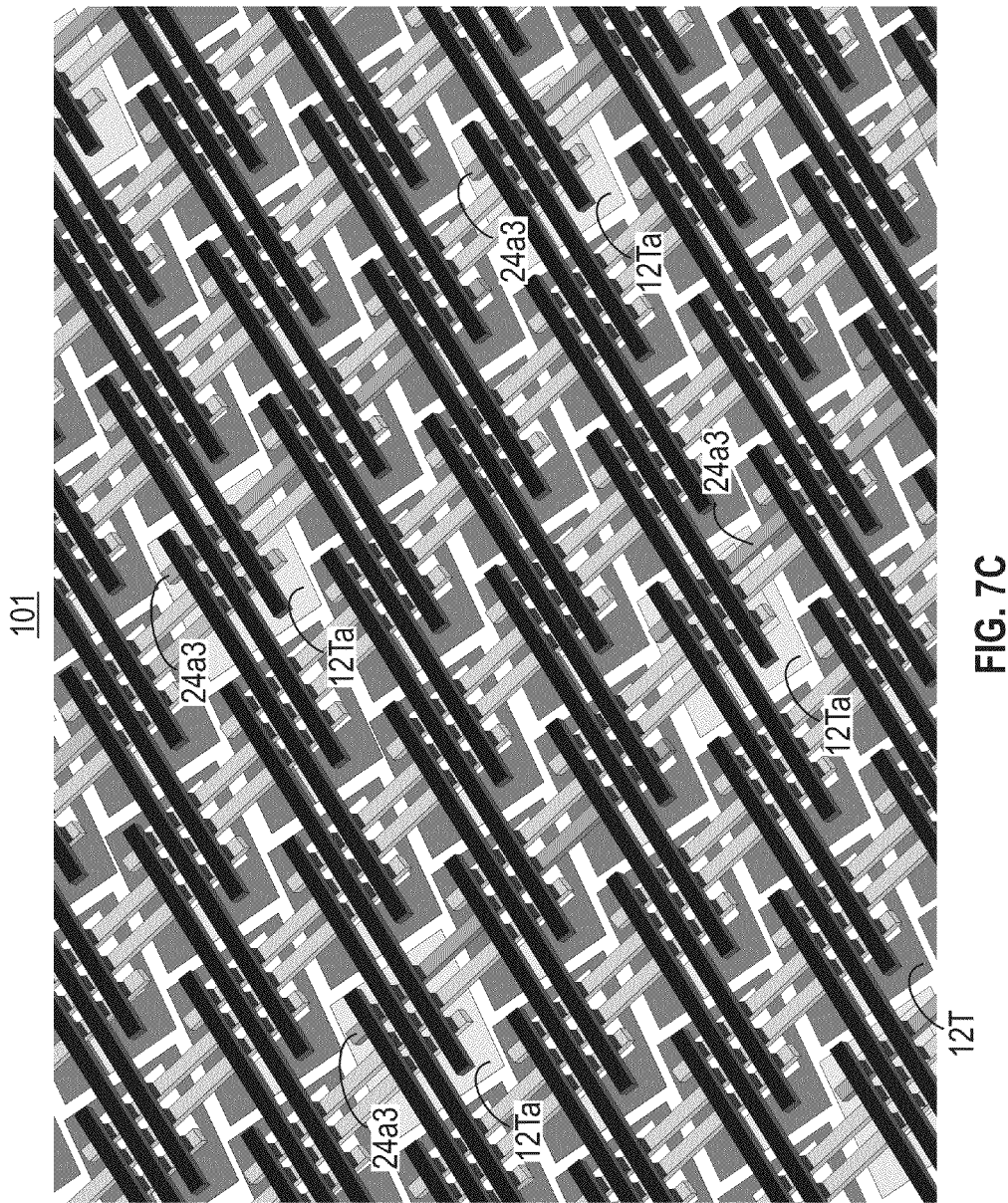
FIG. 7C shows activated crossbar tiles with a third set of activated axons in the network of FIG. 7A, in accordance with an embodiment of the invention.

Specifically, FIG. 7A shows activated tiles 12Ta with a first set of activated axons 24a1 (e.g., each activated axon traverses three adjacent tiles 12T, as shown). FIG. 7B shows the activated tiles 12Ta of FIG. 7A, with a second set of activated axons 24a2. FIG. 7C shows the activated tiles 12Ta of FIG. 7A, with a third set of activated axons 24a3.

Figure 7D:
FIG. 7D shows activated crossbar tiles with a first set of activated dendrites in the network of FIG. 2B, in accordance with an embodiment of the invention.

Similarly, FIG. 7D shows activated tiles 12Ta with a first set of activated dendrites 26a1 (e.g., each activated dendrite traverses three tiles 12T, as shown). FIG. 7E shows the activated tiles 12Ta of FIG. 7D, with a second set of activated dendrites 26a2. FIG. 7F shows the activated tiles 12Ta of FIG. 7D, with a third set of activated dendrites 26a3.

All six phases do not need to use equal time, and may be optimized for their operations. In one embodiment, N=100 and M=10, so each phase comprises $N^2/M$=1,000 sub-phases. An axon communicates a read signal which can read 100 synapses. This is performed by reading synapses in batches of M=10, wherein a first batch comprises dendrites with relative_id 0 through relative_id 9, a second batch comprises axons with relative_id 10 through relative_id 19, and so on. Similarly, each axon takes its turn, comprising reading synapses in batches of 10, wherein a first batch comprises axons with relative_id 0 through relative_id 9, a second batch comprises axons with relative_id 10 through relative_id 19, and so on. In this example, there are 100 axons for a factor of 100.

According to an embodiment of the invention, a clocking scheme sets up constraints on operations and phases in the crossbar network/circuit. No operation occurs unless needed, and circuits wake up as needed. In one example, the neuron resolution is 0.6 ms meaning that there are 1666.66 steps every second. Every step includes six phases (described above), resulting in 10,000 phases in total. Every phase includes 100×10 sub-phases, resulting in 10 million total sub-phases per second, which necessitates a 10 MHz clock rate.

In one embodiment, each dendrite and each axon locally adapts its STDP to ensure that roughly 50% of the synapses are ON. This is a preferable critical state. Further, axon routers are plastic, and can be rerouted. In one embodiment, an inhibitory dendrite may be utilized.

The crossbar architecture is independent of specific device choices for synapses. For example, PCM devices with 10×, 100×, or 1000× higher resistance (current resistance is 10 kOhms), may be utilized as synapses. Other memory technology for synapses may also be used. The term variable state resistor refers to a class of devices in which the application of an electrical pulse (either a voltage or a current) will change the electrical conductance characteristics of the device. For a general discussion of crossbar array neuromorphic and synaptronic systems, as well as to variable state resistors as used in such crossbar arrays, reference is made to K. Likharev, "Hybrid CMOS/Nanoelectronic Circuits: Opportunities and Challenges", J. Nanoelectronics and Optoelectronics, 2008, Vol. 3, p. 203-230, which is hereby incorporated by reference. In one embodiment of the invention, the variable state resistor may comprise a PCM synapse device. Besides PCM devices, other variable state resistor devices that may be used in embodiments of the invention include devices made using metal oxides, sulphides, silicon oxide and amorphous silicon, magnetic tunnel junctions, floating gate FET transistors, and organic thin film layer devices, as described in more detail in the above-referenced article by K. Likharev. The variable state resistor may also be constructed using a static random access memory device, a dynamic random access memory, or an embedded dynamic random access memory.

In one embodiment, a global bit indicates whether the crossbar is in "deploy" mode or whether it is in "train" mode. If in deploy mode, only Phase 1 above is utilized, and remaining phases which relate to training are not used thus saving power consumption. In train mode, all phases are used.

In one embodiment of the invention, the network comprises N×N (e.g., N=10) array of tiles 12T as the basic atomic unit, staggered by N. The crossbar array provides space between tiles 12T where circuits (e.g., 24A, 26A, 14 in FIG. 4) can be placed there between. In one example, only one circuit is placed in one space. Every axon router $X_3$ enumerates from 0 to N−1, and every dendritic router $X_2$, $X_4$ enumerates from 0 to N−1. Each neuron has an (x, y) id. Each axon router $X_3$ has an (x, y) id. The dendritic router $X_2$, $X_4$ has the same id as its associated neuron. Communication from neuron to synapses is logical. Communication from synapses to a neuron is physical. Consequently, axons are distributed, whereas dendrites are local.

In one embodiment of the invention, in a circuit 101 with multiple crossbar arrays 12, every N×N crossbar array 12 has an id, which in one example comprises a 2-tuple of (x, y) where x enumerates from 0 to N−1 and y enumerates from 0 to N−1. At every time step, all crossbar arrays with the same id can be ON. For the ON crossbar arrays, a process steps through axons 0 to N−1, or through dendrites 0 to N−1. The clock rate remains the same as with only one staggered crossbar array. An example clock rate is 10 MHz.

In one embodiment, a diode may be used for "alert" pulses in the crossbar array. In another embodiment, for each N×N crossbar array 12, a side communication mechanism is used for "alert" pulses, eliminating a need for a diode. A diode may be utilized to learn the total number of devices that are ON. This involves turning on all the neuron membranes, applying a voltage at the respective dendrites, and determining the amount of current flow.

In one embodiment, a neuron is updated only once per 0.1 ms, that is, T=0.1. As such, in an event driven fashion power consumption by neuron latches is represented as:

$$C*V^2*F = 10fF/\text{latch}*(10^6 \text{ latches})*(1 \text{ Volt})^2*(1*10^4 \text{ Hz})$$
$$= 0.1 \text{ mW}$$

wherein C is latch capacitance, V is operating voltage, and F is operating frequency.

In one embodiment, each neuron interconnects to 1000 synapses in a crossbar array 12. At a 10 Hz firing rate, each synapse receives only one message per second, wherein the power consumed by synapse latches is:

$$C*V^2*F = 10fF/\text{latch}*(10^6*10^3 \text{ latches})*(1 \text{ Volt})^2*(1*10 \text{ Hz})$$
$$= 0.1 \text{ mW}$$

This provides a balanced design between neuron and synapse power consumption.

In one embodiment, using a gated clock, the circuit consumes essentially no power. A neuron is active it there is reason for it to be active, otherwise the neuron consumes little or no power. In one example, synaptic read events involve the following power consumption:

$10^6*10^3*10*10$ pJ(for PCM+access device)=0.1 J/sec, indicating 0.1 W for all read events.

In one embodiment, synaptic write events involve the following power consumption:

$10^6*10^3*10*100$ pJ/10=0.1 J/sec,indicating 0.1 W per write event(only one in 10 events leads to programming because of probabilistic STDP).

As such, in one embodiment, for 10,000 chips each containing 1 million neurons and 1 billion synapses, the power consumption is 1 kW. This computation does not include system leakage.

In one embodiment, a digital-analog mixed design neuron includes digital accumulation counters, and analog RC circuits for leak. In yet another embodiment, an analog neuron is used that can be naturally implemented in a true event-driven fashion.

In one embodiment, the staggered crossbar array network 101 provides receptive and projective fields for each neuron such that neighboring neurons have overlapping fields. Receptive field of a neuron comprises a set of neurons that the neuron receives input from (e.g., receptive field of a neuron comprises N×N interconnected crossbar circuit tiles in a staggered pattern). Projective field of a neuron comprises a set of neurons that the neuron sends outputs to (e.g., projective field of a neuron comprises N×N interconnected crossbar circuit tiles in a staggered pattern). Staggered connectivity allows designing receptive fields and projective fields, as a function of the spatial location of the neurons. Each neuron has an (x, y) coordinate. Moving from a first neuron at (x, y) to a second neuron at (x+1, y+1), the projective/receptive fields have certain overlap that resembles biological neuron projective/receptive fields.

In one embodiment, an irregular crossbar array network 101 may be utilized. For example, when the parameter M is larger than N, such as M=15 and N=10, certain number axons or dendrites can be changed to be less than 10 and certain number can be changed to be greater than 10 (but less than 16), thus providing irregular receptive and projective fields.

In one embodiment, synchronization is utilized for a global network 101 of inter-linked crossbar arrays 12. In one example, the global network 101 can be divided into blocks of size $N^2 \times N^2$. Asynchronous access is provided to each of the arrays 12 separately, eliminating the need for TDMA across axons and dendrites that need not be active. Each crossbar array 12 is addressed similar to AER mapping to neurons.

In one embodiment, the crossbar size may be doubled but about 75% of the synapses are systematically eliminated (made permanently open) using mask steps. This provides irregularity in receptive fields.

In one embodiment, a clock is used when synchronization is required, wherein neuron leaks (decays) not need to be synchronized.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons. Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising analog or digital circuitry, and additionally as a computer simulation. Indeed, the embodiments of the invention can take the form of an entirely hardware embodiment, an entirely software embodiment or an embodiment containing both hardware and software elements.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
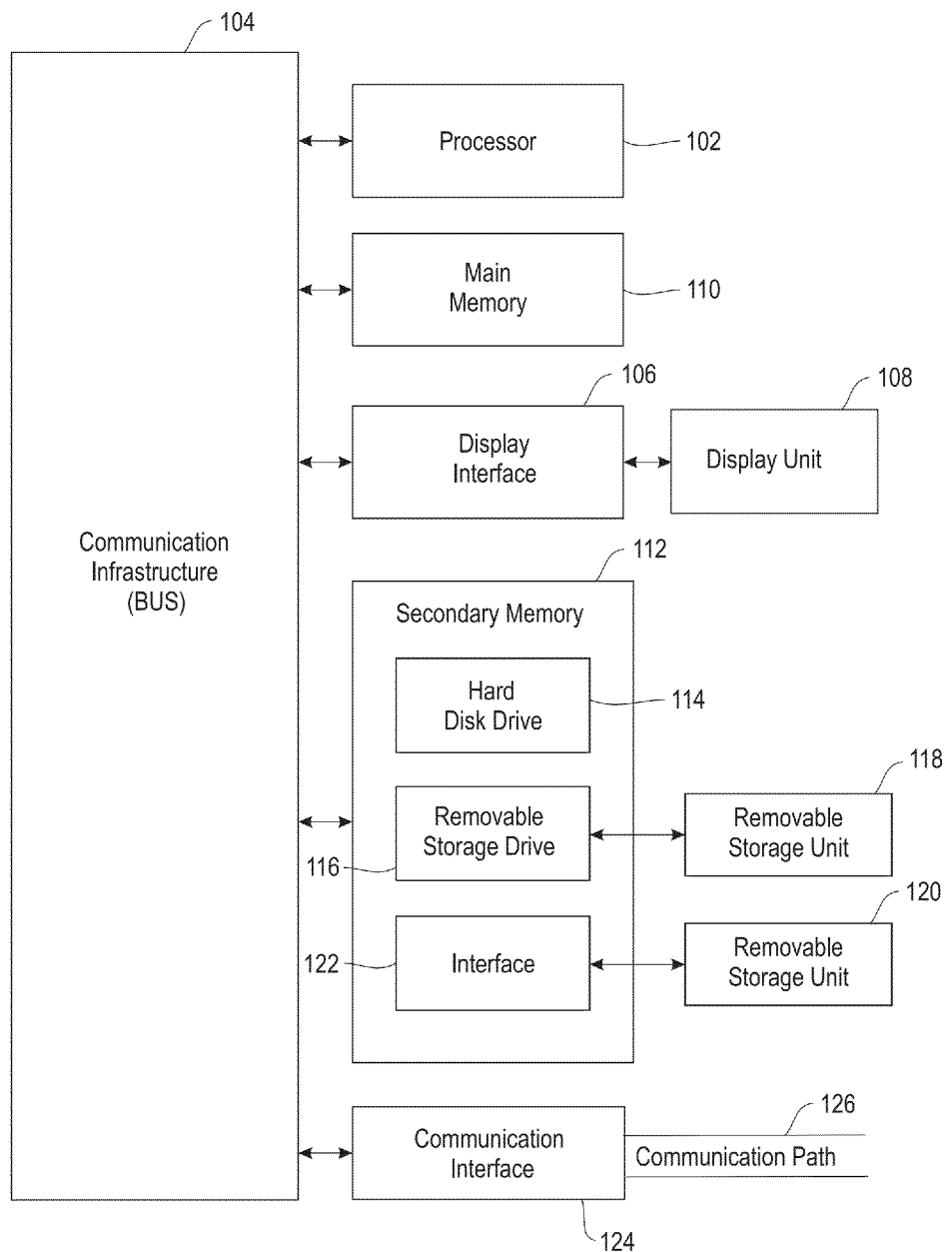
FIG. 8 shows high level block diagram of an information processing system useful for implementing one embodiment of the present invention.

FIG. 8 is a high level block diagram showing an information processing system useful for implementing one embodiment of the present invention. The computer system includes one or more processors, such as a processor 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A neuromorphic and synaptronic system, comprising:
a plurality of electronic neurons; and
a crossbar array network configured for interconnecting the plurality of electronic neurons, the crossbar array network comprising:
a plurality of crossbar arrays, each crossbar array comprising:
a plurality of axons and a plurality of dendrites such that the axons and dendrites are transverse to one another; and
multiple synapse devices, wherein each synapse device is at a cross-point junction of the crossbar array coupled between a dendrite and an axon;
wherein the crossbar arrays are spatially in a staggered pattern providing a staggered crossbar layout of the synapse devices.

2. The system of claim 1, wherein:
the crossbar arrays are spatially in a staggered pattern providing a staggered crossbar layout of the synapse devices in a two dimensional plane, such that the multiple synapse devices of each crossbar array are offset relative to the multiple synapse devices of a neighboring crossbar array.

3. The system of claim 2, wherein:
each crossbar array comprises a crossbar circuit tile including the corresponding plurality of axons, the plurality of dendrites, the multiple synapse devices, and one or more electronic neurons.

4. The system of claim 3, wherein:
each crossbar circuit tile is spatially offset relative to a neighboring crossbar circuit tile.

5. The system of claim 4, wherein:
each crossbar circuit tile comprises N axons, N dendrites, a group of N×N synapse devices, and one or more electronic neurons;
a receptive field of each electronic neuron comprises N×N interconnected crossbar circuit tiles in a staggered pattern; and a projective field of each electronic neuron comprises N×N interconnected crossbar circuit tiles in a staggered pattern;

wherein the crossbar array network includes multiple N×N crossbar circuit tiles.

6. The system of claim 4, wherein:

each crossbar circuit tile is interconnected to a neighboring crossbar circuit tile via N−1 dendrites in a first spatial direction.

7. The system of claim 6, wherein:

each crossbar circuit tile is interconnected to a neighboring crossbar circuit tile via N−1 axons in a second spatial direction that is transverse to the first spatial direction.

8. The system of claim 7, wherein:

each dendrite interconnects N adjacent crossbar circuit tiles in the first spatial direction; and each axon interconnects N adjacent crossbar circuit tiles in the second spatial direction.

9. The system of claim 8, wherein:

each crossbar array comprises a plurality of dendrite drivers corresponding to the plurality of dendrites, wherein each dendrite driver is coupled to a dendrite at a first side of the crossbar array; and a plurality of axon drivers corresponding to the plurality of axons, wherein each axon driver is coupled to an axon at a second side of the crossbar array;

wherein an axon driver and a dendrite driver, coupled by a synapse device at a cross-point junction, in combination generate a signal capable of changing the state of the synapse device as a function of time since a last spiking of an electronic neuron firing a spiking signal into the axon driver and the dendrite driver, producing spike-timing dependent plasticity (STDP).

10. The system of claim 1, wherein:

each of the plurality of electronic neurons corresponds to one of the plurality of the crossbar arrays; and the system further comprises a signal generator for clocking activation of multiple crossbar arrays in the network at the same time.

11. The system of claim 10 wherein:

simultaneous activation of multiple crossbar arrays in the network at a clocking rate is independent of the number of crossbar arrays in the crossbar array network.

12. The system of claim 10, wherein:

the signal generator clocking provides multiple time steps and within each time step provides six operational phases, comprising:

for each of the multiple crossbar arrays and corresponding electronic neurons:

upon an electronic neuron firing, communicating a signal to corresponding axons and dendrites;

the corresponding axons communicating a read signal, which also serves as alert for depressing part of STDP;

the corresponding axons communicating a reset signal and certain dendrites probabilistically respond back;

the corresponding dendrites communicating a set signal and certain axons probabilistically respond back;

reading the number of ON bits on an axon; and reading the number of ON bits on a dendrite.

13. The system of claim 11, wherein:

an axon communication step further comprises sub-steps, wherein within each sub-step multiple synapses receive a read signal;

an axon reset step further comprises sub-steps, wherein within each sub-step multiple axons communicate a reset signal and certain dendrites probabilistically respond back;

a dendritic communication step comprises sub-steps, wherein each sub-step multiple dendrites communicating a set signal and certain axons probabilistically respond back;

an axon reading step comprises sub-steps, wherein each sub-step comprises reading the number of ON bits on multiple axons; and a dendrite reading step comprises sub-steps, wherein each sub-step comprises reading the number of ON bits on multiple dendrites.

14. A method, comprising:

when an electronic neuron spikes, sending a spiking signal from the electronic neuron to each axon and each dendrite connected to a spiking electronic neuron in a network of electronic neurons, producing spike-timing dependent plasticity (STDP);

wherein the network of electronic neurons comprises:

a plurality of electronic neurons; and a crossbar array network configured for interconnecting the plurality of electronic neurons, the crossbar array network comprising:

a plurality of crossbar arrays, each crossbar array comprising:

a plurality of axons and a plurality of dendrites such that the axons and dendrites are transverse to one another; and multiple synapse devices, wherein each synapse device is at a cross-point junction of the crossbar array coupled between a dendrite and an axon;

wherein the crossbar arrays are spatially in a staggered pattern providing a staggered crossbar layout of the synapse devices.

15. The method of claim 14, wherein:

each of the plurality of electronic neurons corresponds to one of the plurality of the crossbar arrays; and the method further comprises generating a clocking signal for activation of multiple crossbar arrays in the network at the same time.

16. The method of claim 15, further comprising:

for each of the multiple crossbar arrays and corresponding electronic neurons, based on the clocking signals:

upon an electronic neuron firing, communicating a signal to corresponding axons and dendrites;

the corresponding axons communicating a read signal, which also serves as alert for depressing part of STDP;

the corresponding axons communicating a reset signal and certain dendrites probabilistically respond back;

the corresponding dendrites communicating a set signal and certain axons probabilistically respond back;

reading the number of ON bits on an axon; and reading the number of ON bits on a dendrite.

17. The method of claim 16, wherein:

the crossbar arrays are spatially in a staggered pattern providing a staggered crossbar layout of the synapse devices in a two dimensional plane, such that the multiple synapse devices of each crossbar array are offset relative to the multiple synapse devices of a neighboring crossbar array.

18. The method of claim 17, wherein:
each crossbar array comprises a crossbar circuit tile including the corresponding plurality of axons, the plurality of dendrites, the multiple synapse devices, and one or more electronic neurons.

19. The method of claim 18, wherein:
each crossbar circuit tile is spatially offset relative to a neighboring crossbar circuit tile, providing a staggered crossbar layout of the multiple synapse devices in each crossbar circuit tile relative to the multiple synapse devices in an adjacent crossbar circuit tile.

20. The method of claim 19, wherein:
each crossbar circuit tile comprises N axons, N dendrites and a group of N×N synapse devices; and
the network comprises N×N interconnected crossbar circuit tiles in a staggered pattern.

21. The method of claim 19, wherein:
each crossbar circuit tile is interconnected to a neighboring crossbar circuit tile via N−1 dendrites in a first spatial direction.

22. The method of claim 21, wherein:
each crossbar circuit tile is interconnected to a neighboring crossbar circuit tile via N−1 axons in a second spatial direction that is transverse to the first spatial direction.

23. The method of claim 22, wherein:
each dendrite interconnects N adjacent crossbar circuit tiles in the first spatial direction; and
each axon interconnects N adjacent crossbar circuit tiles in the second spatial direction.

24. The method of claim 23, wherein:
each crossbar array comprises a plurality of dendrite drivers corresponding to the plurality of dendrites, wherein each dendrite driver is coupled to a dendrite at a first side of the crossbar array; and
a plurality of axon drivers corresponding to the plurality of axons, wherein each axon driver is coupled to an axon at a second side of the crossbar array;
wherein an axon driver and a dendrite driver, coupled by a synapse device at a cross-point junction, in combination generate a signal capable of changing the state of the synapse device as a function of time since a last spiking of an electronic neuron firing a spiking signal into the axon driver and the dendrite driver, producing STDP.

25. A neuromorphic and synaptronic system, comprising:
a plurality of electronic neurons;
a crossbar array network configured for interconnecting the plurality of electronic neurons, the crossbar array network comprising:
a plurality of crossbar arrays, each crossbar array comprising:
a plurality of axons and a plurality of dendrites such that the axons and dendrites are transverse to one another; and
multiple synapse devices, wherein each synapse device is at a cross-point junction of the crossbar array coupled between a dendrite and an axon;
wherein the crossbar arrays are spatially in a staggered pattern providing a staggered crossbar layout of the synapse devices in a two dimensional plane, such that the multiple synapse devices of each crossbar array are offset relative to the multiple synapse devices of a neighboring crossbar array;
wherein each of the plurality of electronic neurons corresponds to one of the plurality of the crossbar arrays; and
a signal generator for clocking activation of multiple crossbar arrays in the network at the same time.

26. The system of claim 25, wherein:
each crossbar array comprises a crossbar circuit tile including the corresponding plurality of axons, the plurality of dendrites and the multiple synapse devices;
each crossbar circuit tile is spatially offset relative to a neighboring crossbar circuit tile, providing a staggered crossbar layout of the multiple synapse devices in each crossbar circuit tile relative to the multiple synapse devices in an adjacent crossbar circuit tile;
each crossbar circuit tile comprises N axons, N dendrites and a group of N×N synapse devices;
the network comprises N×N interconnected crossbar circuit tiles in a staggered pattern;
each crossbar circuit tile is interconnected to a neighboring crossbar circuit tile via N−1 dendrites in a first spatial direction;
each crossbar circuit tile is interconnected to a neighboring crossbar circuit tile via N−1 axons in a second spatial direction that is transverse to the first spatial direction;
each dendrite interconnects N adjacent crossbar circuit tiles in the first spatial direction;
each axon interconnects N adjacent crossbar circuit tiles in the second spatial direction;
each crossbar array further comprises a plurality of dendrite drivers corresponding to the plurality of dendrites, wherein each dendrite driver is coupled to a dendrite at a first side of the crossbar array; and
each crossbar array further comprises a plurality of axon drivers corresponding to the plurality of axons, wherein each axon driver is coupled to an axon at a second side of the crossbar array;
wherein an axon driver and a dendrite driver, coupled by a synapse device at a cross-point junction, in combination generate a signal capable of changing the state of the synapse device as a function of time since a last spiking of an electronic neuron firing a spiking signal into the axon driver and the dendrite driver, producing spike-timing dependent plasticity (STDP).

27. The system of claim 26, wherein the signal generator clocking provides six operational phases, comprising:
for each of the multiple crossbar arrays and corresponding electronic neurons:
upon an electronic neuron firing, communicating a signal to corresponding axons and dendrites;
the corresponding axons communicating a read signal, which also serves as alert for depressing part of STDP;
the corresponding axons communicating a reset signal and certain dendrites probabilistically respond back;
the corresponding dendrites communicating a set signal and certain axons probabilistically respond back;
reading the number of ON bits on an axon; and
reading the number of ON bits on a dendrite.

* * * * *